(12) United States Patent
Kataria (10) Patent No.: US 12,386,531 B2
(45) Date of Patent: Aug. 12, 2025

(54) PARTIAL BLOCK PERFORMANCE MANAGEMENT

(71) Applicant: Seagate Technology LLC, Fremont, CA (US)

(72) Inventor: Abhaykumar Kataria, Fremont, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/713,047

(22) Filed: Apr. 4, 2022

(65) Prior Publication Data

US 2023/0315317 A1    Oct. 5, 2023

(51) Int. Cl.
*G06F 3/06* (2006.01)
*G06F 12/0882* (2016.01)

(52) U.S. Cl.
CPC ............ *G06F 3/064* (2013.01); *G06F 3/0622* (2013.01); *G06F 3/0679* (2013.01); *G06F 12/0882* (2013.01)

(58) Field of Classification Search
None
See application file for complete search history.

(56) References Cited

U.S. PATENT DOCUMENTS

| 9,171,574 | B1* | 10/2015 | Zaw ................... G11B 20/1217 |
| 2006/0238915 | A1* | 10/2006 | Hendriks ............. G11B 33/148 360/97.13 |
| 2011/0090772 | A1 | 4/2011 | Nakamura |
| 2012/0151134 | A1* | 6/2012 | Friendshuh ......... G06F 12/0802 711/119 |
| 2017/0168890 | A1* | 6/2017 | Marripudi ............. G06F 3/0619 |
| 2018/0335975 | A1 | 11/2018 | Cosby et al. |
| 2020/0117382 | A1 | 4/2020 | Yoon |
| 2021/0026781 | A1 | 1/2021 | Dong et al. |
| 2022/0283739 | A1* | 9/2022 | Benisty ................ G06F 3/0679 |

* cited by examiner

*Primary Examiner* — Yaima Rigol
(74) *Attorney, Agent, or Firm* — HOLZER PATEL DRENNAN (57) ABSTRACT

The technology disclosed herein provides a method including receiving a plurality of host write requests at a plurality of host logical block addresses (HLBAs), determining spatial adjacency of the plurality of host LBA write requests on a media of a storage device, and in response to determining that the spatial adjacency of the plurality of host LBAs (HLBAs) write requests meets a spatial adjacency condition reading data from a plurality of storage device LBAs (DLBAs) corresponding to each of the plurality of HBLAs into a cache, modifying the read data for each of the plurality of DBLAs in the cache, and writing the modified data at each of the plurality of DBLAs during a single data write operation.

20 Claims, 6 Drawing Sheets

PARTIAL BLOCK PERFORMANCE MANAGEMENT

BACKGROUND

Modern data storage systems extensively use data centers for storing large amounts of data. In some implementations of data centers storage devices such as hard disc drives (HDDs) and solid state drives (SSDs) are used to store the data. Such HDD or SSD storage devices store data in block sizes that are particular to the system. For example, an implementation of data center storage device may store data on a 4 kilobyte (KB) sectors. On the other hand, applications communicating with the data centers may have the data communicated in sector sizes that are native to the applications and may be different than the data storage device sector sizes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein provides a method including receiving a plurality of host write requests at a plurality of host logical block addresses (HLBAs), determining spatial adjacency of the plurality of host LBA write requests on a media of a storage device, and in response to determining that the spatial adjacency of the plurality of host LBAs (HLBAs) write requests meets a spatial adjacency condition reading data from a plurality of storage device LBAs (DLBAs) corresponding to each of the plurality of HBLAs into a cache, modifying the read data for each of the plurality of DBLAs in the cache, and writing the modified data at each of the plurality of DBLAs during a single data write operation.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Modern data storage systems extensively use data centers for storing large amounts of data. In some implementations of data centers storage devices such as hard disc drives (HDDs) and solid state drives (SSDs) are used to store the data. Such HDD or SSD storage devices store data in block sizes that are particular to the system. For example, an implementation of data center storage device may store data on a 4 kilobyte (KB) sectors. On the other hand, applications communicating with the data centers may have the data communicated in sector sizes that are native to the applications and may be different than the data storage device sector sizes.

The technology disclosed herein pertains to optimizing the time it tales to do the RMW operations for multiple host data blocks, such as for example, meta data blocks. Specifically, an implementation disclosed herein provides a method for improving the read-modify-write (RMW) performance of storage devices (HDD/SSD). Specifically, any time there is a discrepancy in the size of LBAs for host compared to storage devices, with the host LBAs (HLBAs) being smaller in size than the storage device LBAs (DLBAs), the disclosed technology allows optimizing the RMW operations. In one disclosed implementation, if it is determined that the HLBAs are smaller than DLBAs and the number of DLBAs being modified are adjacent (for example, on the same track for an HDD and on the same page for SSD), the disclosed technology reads the sectors from a group of adjacent DLBAs during one revolution/page write. Subsequently, the sectors to be modified are modified substantially simultaneously in volatile memory and written to the group of adjacent DLBAs during the subsequent revolution/page write. In one implementation, the method can accommodate skip sectors, also known as sectors, that do not need to be contiguous, but they need to be on a same page or track of the storage device. As a result, for example, the time for writing data to six sectors on a same page or track of the storage device can be reduced from 18 operations to three operations.

Figure 1:
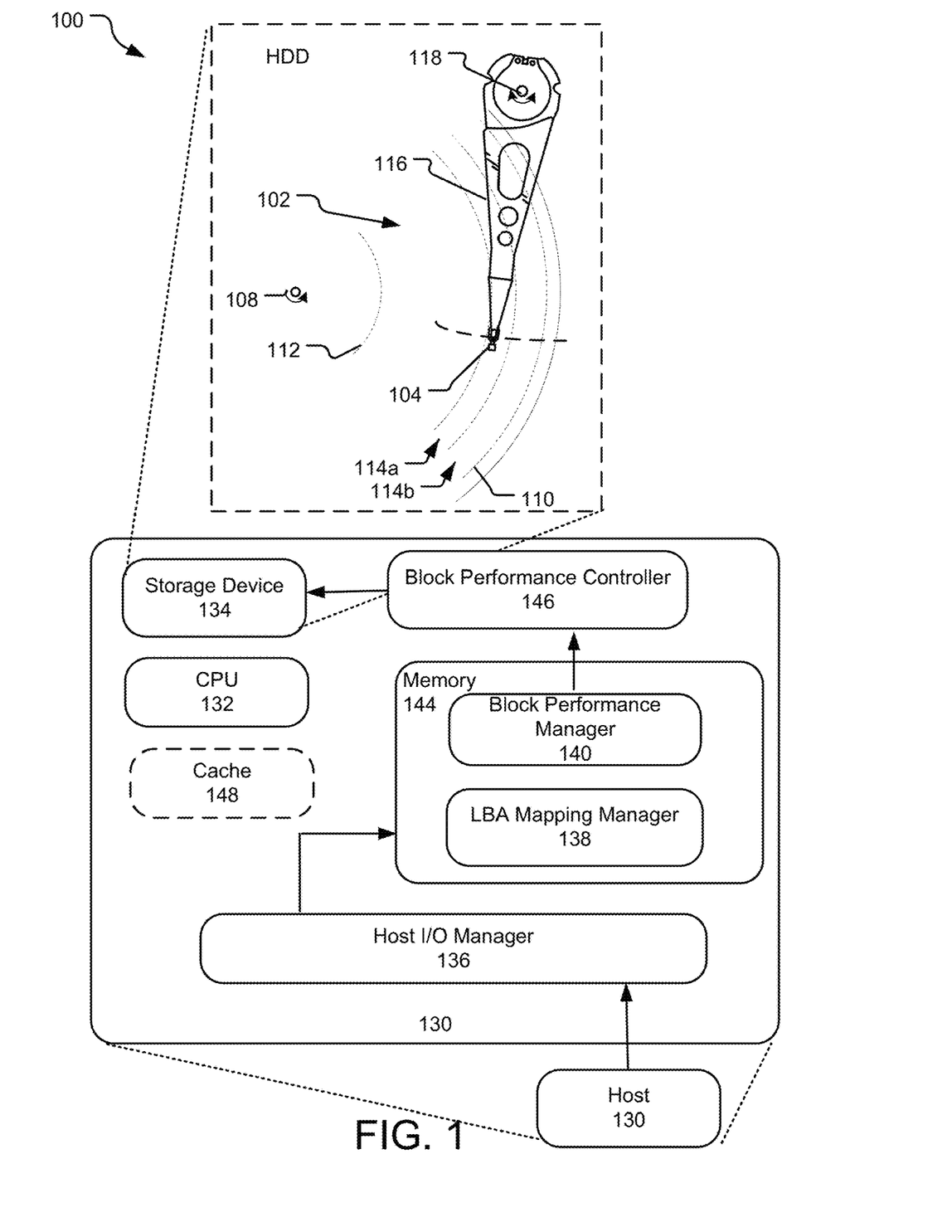
FIG. 1 illustrates a schematic diagram of an example HDD storage device controller system disclosed herein.

FIG. 1 illustrates a schematic diagram of a storage device controller system 100 implementing the partial block performance management technology disclosed herein. Specifically, the storage device controller system 100 may be implemented on a computer 130 including a CPU 132 and a storage device 134. In the illustrated implementation, the storage device 134 is an HDD. However, in an alternative implementation, the storage device 134 may be an SSD or other type of storage device. The computer 130 may also include a memory 144, such as a read-only memory (ROM) or random access memory (RAM) that is collectively used to implement one or more functionalities of the partial block performance management technology disclosed herein.

The computing device 130 may be represented as a host 150 using a host input/output manger 136. Specifically, the host I/O manger 136 may receive request to read, modify and/or write (RMW) data to the storage device 134 from the host. The storage device 134 may have data mapped therein at a granularity of disc logical block addresses (DLBAs) or page logical block addresses (PLBAs), respectively for the storage device 134 being an HDD or an SDD. For example, if the storage device 134 is an HDD, the DLBA may be 4 KB in granularity.

In the illustrated implementation, the storage device HDD 134 may store data on media 102 that is configured on a number of concentric tracks 114 between an inner diameter (ID) 112 and an outer diameter (OD) 110. The HDD may be configured to spin around an axis 108 whereas the arm 116 may be configured to rotate around a spindle 118 so that the reader 104 is able to access various tracks between the ID and the OD. Each of the tracks 114 may be divided into DLBAs of 4K and multiple HLBAs maybe mapped to each of the DLBAs. The arm 116 may move in a direction diagonal to the direction of the tracks 114 and when the reader 104 is on a given track, say track 114a, a number of DLBAs on this track 114a may be read or written to as result of the rotation of the disc around the axis 108.

In one implementation, the request for data RMW may be mapped to holt logical block addresses (HLBAs). Furthermore, the data RMW request from the host may have HLBAs mapped to a granularity of an HLBA size, such as for example 500 bytes. The host I/O manager 136 communicates the data RMW requests from the host 150 to an LBA mapping manager 138 that maybe implemented on the memory 144. The LBA mapping manager 138 may map particular HLBAs to the DLBAs on the tracks 114 of the storage device 134.

In one implementation, the mapping of the HLBAs to the DLBAs is used by a block performance manager 140 to perform one or more partial block performance enhancement management functions. For example, in response to receiving a set of RMW requests to a set of HLBAs from the host 150 for certain blocks of the track 114, the block performance manager 140 determines the spatial adjacency of the LBA requests. For example, the block performance manager 140 reviews a set of RMW requests to see if they are spatially adjacent such that the set of requests are directed to DLBAs within a single track 114 of the storage device 134. In one implementation, the determination of the spatial adjacency condition may be determined to be met if the set of RMW requests can be executed within a single servo move of the arm 116. For example, if the set of RMW requests are directed to HLBAs that are all mapped to DLBAs within a single track 114 of the storage device 134, the spatial adjacency condition is determined to have been met.

If the storage device 134 is an SSD, the block performance manager 140 reviews a set of RMW requests to see if they are spatially adjacent such that the set of requests are directed to DLBAs within a single page of the storage device 134. In such an implementation, the spatial adjacency condition may be determined to be met if the set of RMW requests can be executed within a single write to a page NAND flash of the SSD. For example, if the set of RMW requests are directed to HLBAs that are all mapped to DLBAs within a single page of the SSD storage device 134, the spatial adjacency condition is determined to have been met.

If the block performance manager 140 determines that the set of RMW requests are spatially adjacent, the block performance manager 140 reads the data for each DLBA corresponding to the HLBA of the set of RMW requests into a cache 148. Thus, for example, if six HLBA requests are determined to be spatially adjacent, the data from DLBAs corresponding to each of these six HLBA requests are read into the cache 148. Subsequently, a modify operation may be performed in the cache 148 on the read data for each of the plurality of DLBAs in the cache 148. The modified data for each of the plurality of DLBAs in the cache 148 is written back to the DLBAs.

In an alternative implementation, in response to determining that a set of HLBA update requests are spatially adjacent, the HLBA update requests are held in a cache 148 of the computing device 130. In such an implementation, a rude power loss execution flag maybe initiated along such that the rude power loss execution flag initiates an operation to write the data from the set of HLBA update requests held in the cache 148 to a section of the media of a storage device 134. In yet another implementation, the storage media of the storage device 134 may have a dedicated region that is configured to store data related to spatially adjacent HLBAs. In such an implementation, in response to determining that a set of HLBA update requests are spatially adjacent, the HLBA update requests are written to dedicated region that is configured to store data related to spatially adjacent HLBAs.

Figure 2:
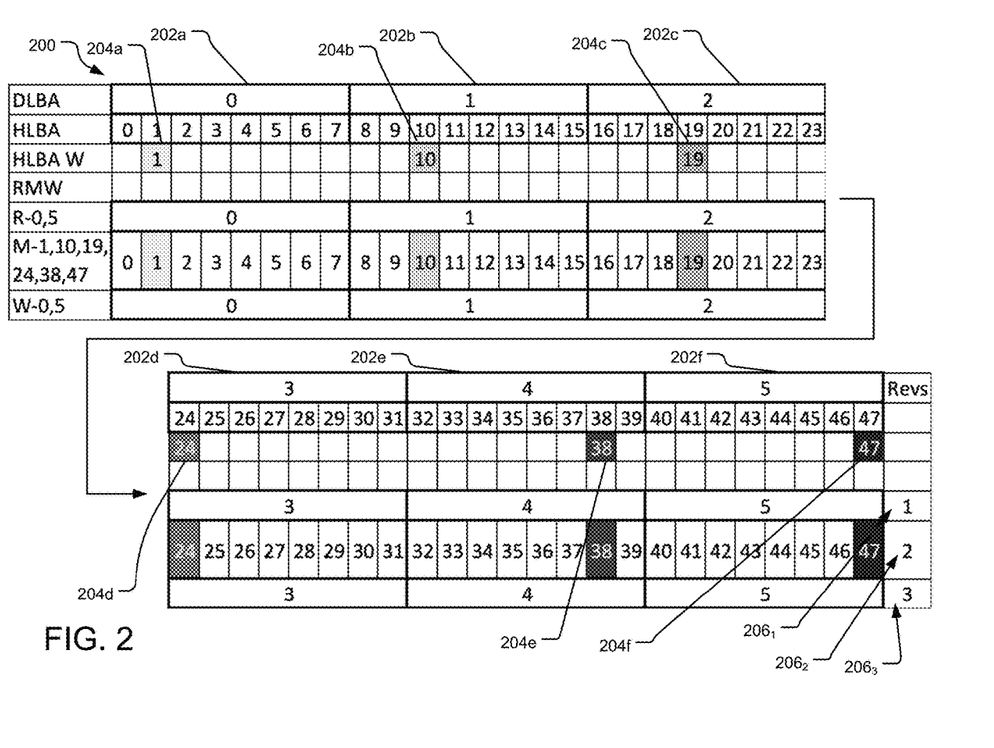
FIG. 2 illustrates example schematic of a logical block address (LBA) mapping used in optimized partial block read modify write (RMW) operations.

FIG. 2 illustrates example schematic of a logical block address (LBA) mapping 200 used in optimized partial block RMW operations. Specifically, FIG. 2 illustrates optimizing the RMW to a set of DLBAs on a storage device. As shown herein a host may communicate a set of write or RMW operations 204 to a storage controller. For example, the host may communicate the set of write or RMW operations 204 directed to HLBAs 1, 10, 19, 24, 38, and 47. Specifically, the HLBAs 1, 10, 19, 24, 38, and 47 are mapped to DLBAs (0-6) 202. In the illustrated example, each of the DLBAs (0-6) 202 are spatially adjacent in that they are all on either one track (in the case of the storage device 134 being an HDD) or on the same page of NAND flashes (in the case of the storage device 124 being SSD).

As a result, in the first revolution $206_1$, the storage controller reads data from each of the DLBAs 202 into a cache of the storage device. Subsequently at the next revolution $206_2$, the data at the HLBAs 1, 10, 19, 24, 38, and 47 are modified in the cache. At the next revolution $206_3$, the modified data for the DLBAs 202 are written back, thus updating the values of the data at storage media that is mapped to the HLBAs 1, 10, 19, 24, 38, and 47. Thus, the updating of the data at the HLBAs 1, 10, 19, 24, 38, and 47 can be accomplished in as few as three revolutions.

Figure 3:
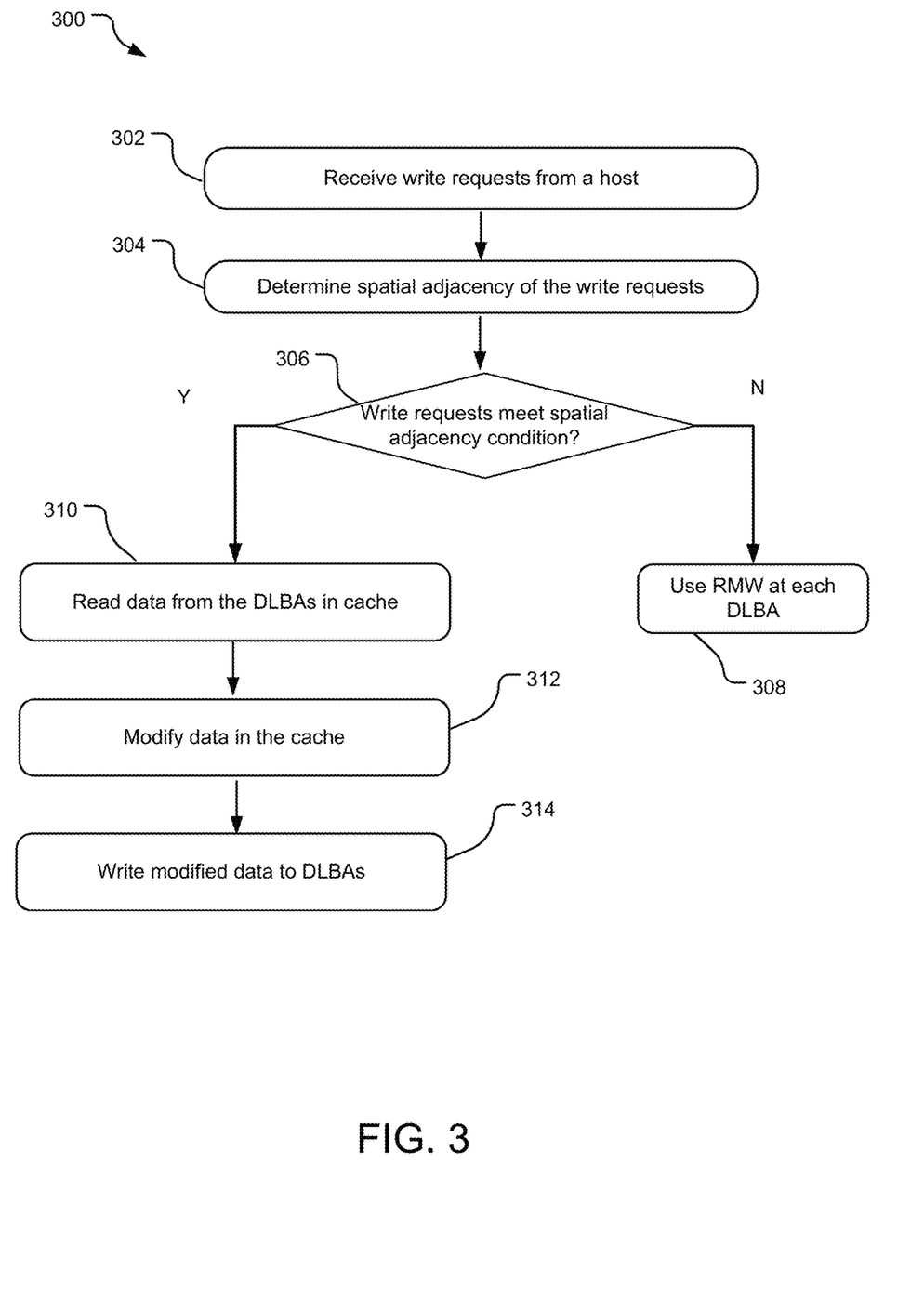
FIG. 3 illustrates example operations for managing partial block performance as per the storage system disclosed herein.

FIG. 3 illustrates example operations 300 for managing partial block performance as per the storage system disclosed herein. Specifically, an operation 302 receives write requests from a host. For example, the write requests may be a set of write requests to write data to a set of HLBAs that are mapped to a set of adjacent DLBAs. An operation 304 determines spatial adjacency of the set of write requests. For example, the spatial adjacency may be determined by determining if the set of write requests meet a spatial adjacency condition. An operation 306 determines if the set of write requests meet a spatial adjacency condition. In one implementation, where the storage device is an HDD, the spatial adjacency condition may specify that the set of HLBA write requests are mapped to a set of DLBAs that are on a single track of the storage device. Alternatively, if the storage device is an SSD, the spatial adjacency condition may specify that the set of HLBA write requests are mapped to a set of DLBAs that are on a single page of the storage device.

If the spatial adjacency condition is not satisfied, an operation 308 performs RMW at each of the DLBAs that are mapped to the set of write request HLBAs. If the spatial adjacency condition is satisfied, an operation 310 reads the data from a set of storage device LBAs (DLBAs) corresponding to each of the plurality of HBLAs into a cache. Subsequently, an operation 312 modifies the data in the cache in accordance with the set of write requests. An operation 314 writes the modified data at each of the plurality of DBLAs during a single data write operation.

Figure 4:
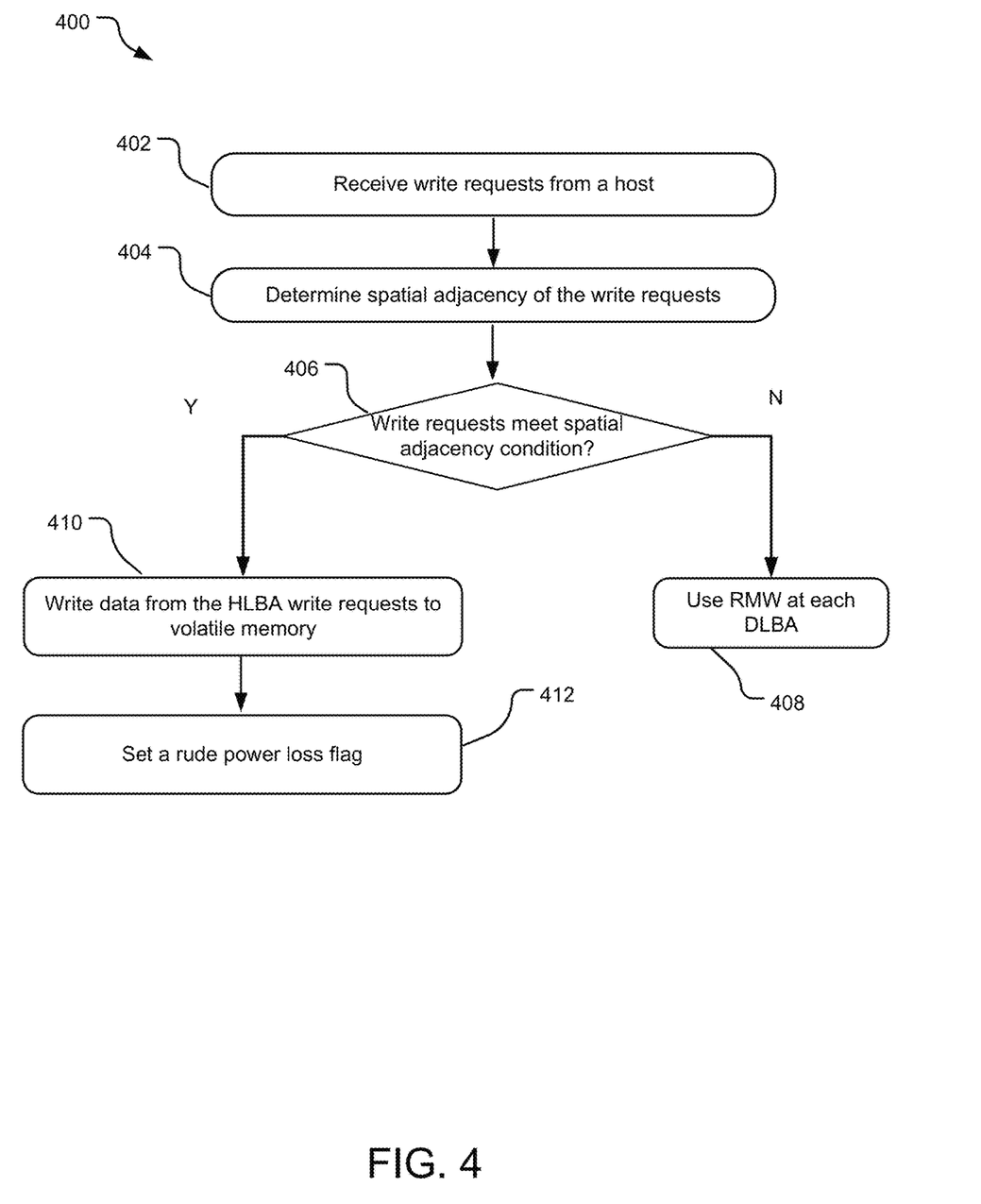
FIG. 4 illustrates alternative example operations for managing partial block performance as per the storage system disclosed herein.

FIG. 4 illustrates alternative example operations 400 for managing partial block performance as per the storage system disclosed herein. Specifically, an operation 402 receives write requests from a host. For example, the write requests may be a set of write requests to write data to a set of HLBAs that are mapped to a set of adjacent DLBAs. An operation 404 determines spatial adjacency of the set of write requests. For example, the spatial adjacency may be determined by determining if the set of write requests meet a spatial adjacency condition. An operation 406 determines if the set of write requests meet a spatial adjacency condition. In one implementation, where the storage device is an HDD, the spatial adjacency condition may specify that the set of HLBA write requests are mapped to a set of DLBAs that are on a single track of the storage device. Alternatively, if the storage device is an SSD, the spatial adjacency condition may specify that the set of HLBA write requests are mapped to a set of DLBAs that are on a single page of the storage device.

If the spatial adjacency condition is not satisfied, an operation 408 performs RMW at each of the DLBAs that are mapped to the set of write request HLBAs. If the spatial adjacency condition is satisfied, an operation 410 writes the data from the set of host HLBA write requests in a volatile memory. Subsequently, an operation 412 initiates a rude power loss execution flag, where the rude power loss execution flag initiates an operation to write the data from the plurality of HLBA write requests from the volatile memory to a section of the media of a storage device.

Figure 5:
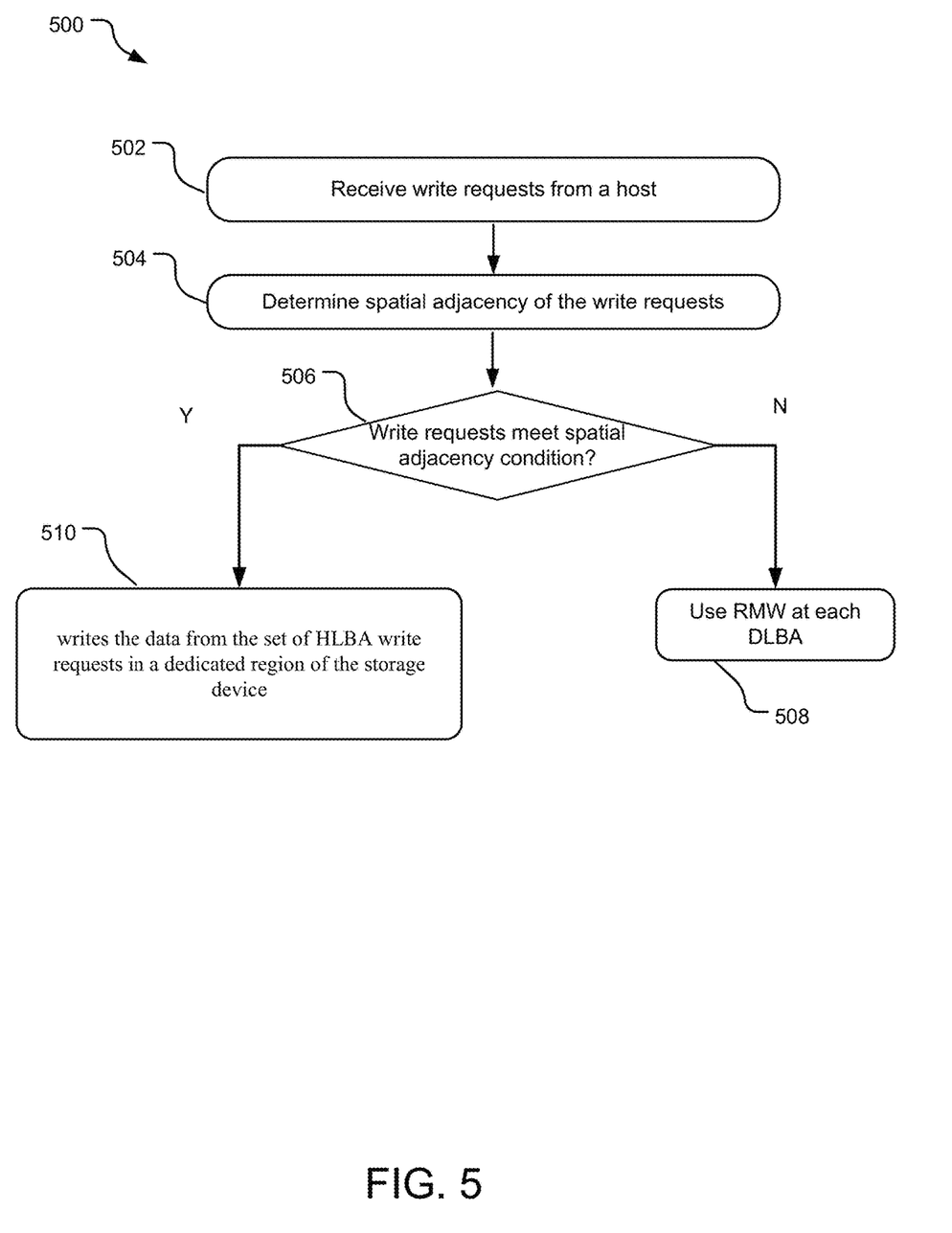
FIG. 5 illustrates yet another alternative example operations for managing partial block performance as per the storage system disclosed herein.

FIG. 5 illustrates yet another alternative example operations for managing partial block performance as per the storage system disclosed herein. Specifically, an operation 502 receives write requests from a host. For example, the write requests may be a set of write requests to write data to a set of HLBAs that are mapped to a set of adjacent DLBAs. An operation 504 determines spatial adjacency of the set of write requests. For example, the spatial adjacency may be determined by determining if the set of write requests meet a spatial adjacency condition. An operation 506 determines if the set of write requests meet a spatial adjacency condition. In one implementation, where the storage device is an HDD, the spatial adjacency condition may specify that the set of HLBA write requests are mapped to a set of DLBAs that are on a single track of the storage device. Alternatively, if the storage device is an SSD, the spatial adjacency condition may specify that the set of HLBA write requests are mapped to a set of DLBAs that are on a single page of the storage device.

If the spatial adjacency condition is not satisfied, an operation 508 performs RMW at each of the DLBAs that are mapped to the set of write request HLBAs. If the spatial adjacency condition is satisfied, an operation 510 writes the data from the set of HLBA write requests in a dedicated region of the storage device, wherein the dedicated region of the storage device is configured to support fractional data sectors. The data from the dedicated region of the storage device may be moved to the destination DLBAs during idle time for the storage device or in response to a rude power loss.

Figure 6:
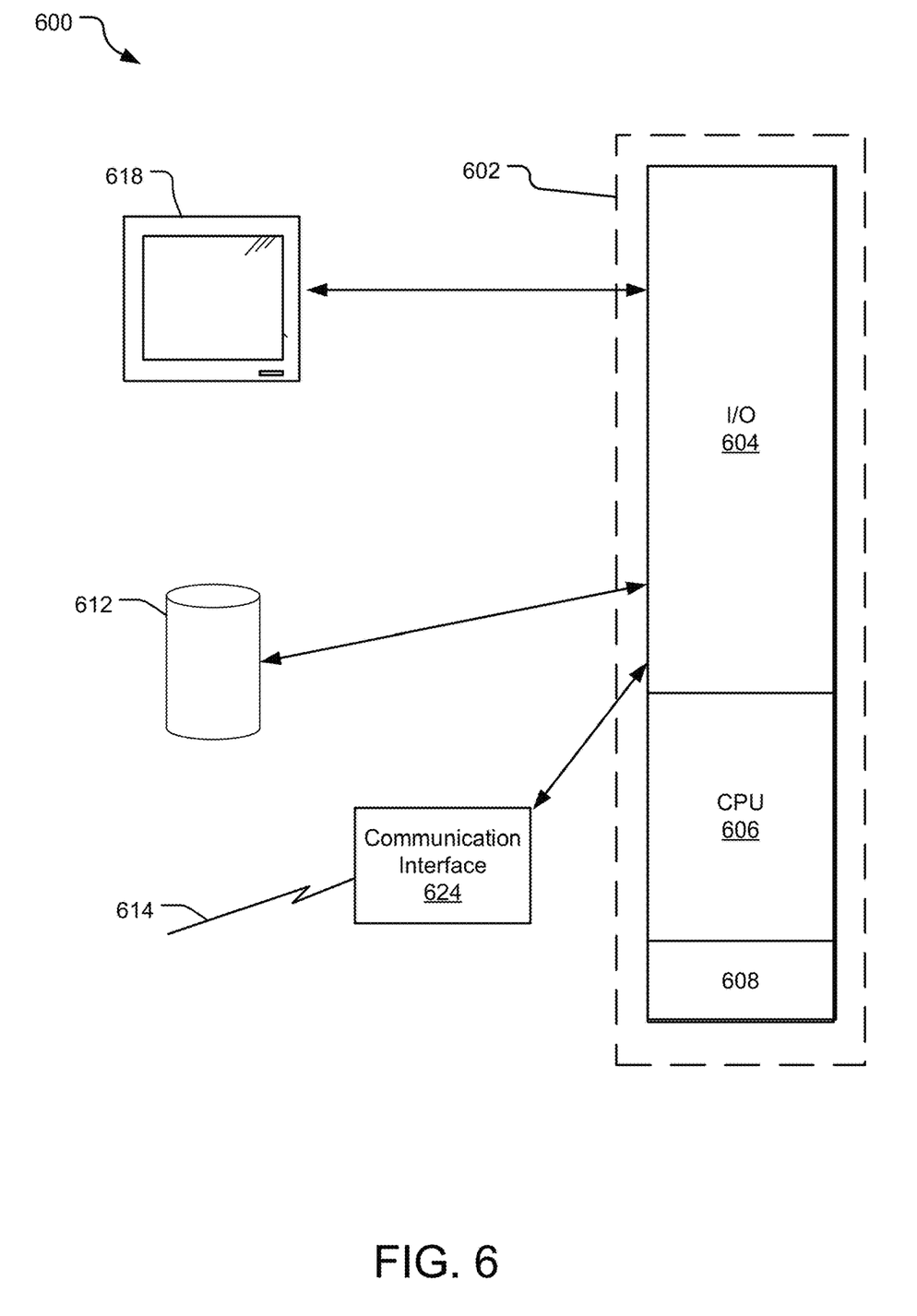
FIG. 6 illustrates an example processing system that may be useful in implementing the described technology.

FIG. 6 illustrates an example processing system 600 that may be useful in implementing the described technology. The processing system 600 is capable of executing a computer program product embodied in a tangible computer-readable storage medium to execute a computer process. Data and program files may be input to the processing system 600, which reads the files and executes the programs therein using one or more processors (CPUs or GPUs). Some of the elements of a processing system 600 are shown in FIG. 6 wherein a processor 602 is shown having an input/output (I/O) section 604, a Central Processing Unit (CPU) 606, and a memory section 608. There may be one or more processors 602, such that the processor 602 of the processing system 600 comprises a single central-processing unit 606, or a plurality of processing units. The processors may be single core or multi-core processors. The processing system 600 may be a conventional computer, a distributed computer, or any other type of computer. The described technology is optionally implemented in software loaded in memory 608, a storage unit 612, and/or communicated via a wired or wireless network link 614 on a carrier signal (e.g., Ethernet, 3G wireless, 8G wireless, LTE (Long Term Evolution)) thereby transforming the processing system 600 in FIG. 6 to a special purpose machine for implementing the described operations. The processing system 600 may be an application specific processing system configured for supporting a distributed ledger. In other words, the processing system 600 may be a ledger node.

The I/O section 604 may be connected to one or more user-interface devices (e.g., a keyboard, a touch-screen display unit 618, etc.) or a storage unit 612. Computer program products containing mechanisms to effectuate the systems and methods in accordance with the described technology may reside in the memory section 608 or on the storage unit 612 of such a system 600.

A communication interface 624 is capable of connecting the processing system 600 to an enterprise network via the network link 614, through which the computer system can receive instructions and data embodied in a carrier wave. When used in a local area networking (LAN) environment, the processing system 600 is connected (by wired connection or wirelessly) to a local network through the communication interface 624, which is one type of communications device. When used in a wide-area-networking (WAN) environment, the processing system 600 typically includes a modem, a network adapter, or any other type of communications device for establishing communications over the wide area network. In a networked environment, program modules depicted relative to the processing system 600 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 608 and/or the storage unit 612 and executed by the processor 602. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 608 and/or the storage unit 612 and executed by the processor 602.

The processing system 600 may be implemented in a device, such as a user device, storage device, IoT device, a desktop, laptop, computing device. The processing system 600 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
receiving a plurality of host write requests at a plurality of host logical block addresses (HLBAs);
determining spatial adjacency of the plurality of host LBA write requests on a media of a storage device; and
in response to determining that the spatial adjacency of the plurality of host LBAs (HLBAs) write requests meets a spatial adjacency condition:
reading data from a plurality of storage device LBAs (DLBAs) corresponding to each of the plurality of HBLAs into a cache,
modifying the read data for each of the plurality of DBLAs in the cache, and,
in response to determining that the spatial adjacency of the plurality of HLBA write requests meets the spatial adjacency condition, writing the data from the plurality of HLBA write requests in a volatile memory and initiating a rude power loss execution flag, where the rude power loss execution flag initiates an operation to write the data from the plurality of HLBA write requests from the volatile memory to a section of the media of the storage device.

2. The method of claim 1, wherein the storage device is a hard disc drive (HDD) and the spatial adjacency condition specifies that each of the reading, modifying, and writing operations are directed to DLBAs within a single track of the storage device.

3. The method of claim 1, wherein the storage device is a solid state drive (SDD) and the spatial adjacency condition specifies that the plurality of HLBA write requests can be satisfied with a write operation to a single page.

4. The method of claim 1, wherein the storage device is a hard disc drive (HDD) and the single data write operation comprising a write to a single track of the storage device.

5. The method of claim 1, wherein the storage device is a solid state drive (SDD) and the single data write operation comprising a write to a single page of the storage device.

6. The method of claim 1, further comprising:
writing the modified data at each of the plurality of DBLAs during a single data write operation.

7. The method of claim 1, further comprising in response to determining that the spatial adjacency of the plurality of host LBA write requests meets the spatial adjacency condition, writing the data from the plurality of host LBA write requests in a dedicated region of the storage device, wherein the dedicated region of the storage device is configured to support fractional data sectors.

8. In a computing environment, a method performed at least in part on at least one processor, the method comprising:
receiving a plurality of host write requests at a plurality of host logical block addresses (HLBAs);
determining spatial adjacency of the plurality of host LBA write requests on a media of a storage device; and in response to determining that the spatial adjacency of the plurality of host LBAs (HLBAs) write requests meets a spatial adjacency condition:
reading data from a plurality of storage device LBAs (DLBAs) corresponding to each of the plurality of HBLAs into a cache,
modifying the read data for each of the plurality of DBLAs in the cache, and,
in response to determining that the spatial adjacency of the plurality of HLBA write requests meets the spatial adjacency condition, writing the data from the plurality of host LBA write requests in a volatile memory and initiating a rude power loss execution flag, where the rude power loss execution flag initiates an operation to write the data from the plurality of host LBA write requests from the volatile memory to a section of the media of the storage device.

9. The method of claim 8, wherein the storage device is a hard disc drive (HDD) and the spatial adjacency condition specifies that each of the reading, modifying, and writing operations are directed to DLBAs within a single track of the storage device.

10. The method of claim 8, wherein the storage device is a solid state drive (SDD) and the spatial adjacency condition specifies that the plurality of HLBA write requests can be satisfied with a write operation to a single page.

11. The method of claim 8, wherein the storage device is a hard disc drive (HDD) and the single data write operation comprising a write to a single track of the storage device.

12. The method of claim 8, wherein the storage device is a solid state drive (SDD) and the single data write operation comprising a write to a single page of the storage device.

13. The method of claim 8, further comprising:
writing the modified data at each of the plurality of DBLAs during a single data write operation.

14. The method of claim 8, further comprising in response to determining that the spatial adjacency of the plurality of host LBA write requests meets the spatial adjacency condition, writing the data from the plurality of host LBA write requests in a dedicated region of the storage device, wherein the dedicated region of the storage device is configured to support fractional data sectors.

15. One or more non-transitory tangible computer-readable storage media encoding computer-executable instructions for executing on a computer system a computer process, the computer process comprising:
receiving a plurality of host write requests at a plurality of host logical block addresses (HLBAs);
determining spatial adjacency of the plurality of host LBA write requests on a media of a storage device; and
in response to determining that the spatial adjacency of the plurality of host LBAs (HLBAs) write requests meets a spatial adjacency condition:
reading data from a plurality of storage device LBAs (DLBAs) corresponding to each of the plurality of HBLAs into a cache,
modifying read the data for each of the plurality of DBLAs in the cache, and,
in response to determining that the spatial adjacency of the plurality of HLBA write requests meets the spatial adjacency condition, writing the data from the plurality of HLBA write requests in a volatile memory and initiating a rude power loss execution flag, where the rude power loss execution flag initiates an operation to write the data from the plurality of HLBA write requests from the volatile memory to a section of the media of the storage device.

16. The one or more non-transitory tangible computer-readable storage media of claim 15, wherein the storage device is a hard disc drive (HDD) and the spatial adjacency condition specifies that the plurality of HLBA write requests can be satisfied without a servo move.

17. The one or more non-transitory tangible computer-readable storage media of claim 15, wherein the storage device is a solid state drive (SDD) and the spatial adjacency condition specifies that the plurality of HLBA write requests can be satisfied with a write operation to a single page.

18. The one or more non-transitory tangible computer-readable storage media of claim 15, wherein the storage device is a hard disc drive (HDD) and the single data write operation comprising a write to a single track of the storage device.

19. The one or more non-transitory tangible computer-readable storage media of claim 15, wherein the storage device is a solid state drive (SDD) and the single data write operation comprising a write to a single page of the storage device.

20. The one or more non-transitory tangible computer-readable storage media of claim 15, further comprising:
writing the modified data at each of the plurality of DBLAs during a single data write operation.

* * * * *